(12) United States Patent
Gorenflo et al.

(10) Patent No.: US 7,219,433 B2
(45) Date of Patent: May 22, 2007

(54) ADJUSTABLE ANTIVIBRATION SYSTEM, IN PARTICULAR FOR A HAND-HELD WORK MACHINE

(75) Inventors: Ernst Gorenflo, Heinsheim (DE); Olaf Kruse, Glinde (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 10/617,404

(22) Filed: Jul. 9, 2003

(65) Prior Publication Data

US 2004/0016133 A1 Jan. 29, 2004

(30) Foreign Application Priority Data

Jul. 10, 2002 (DE) ................. 202 11 390

(51) Int. Cl.
*B27B 17/02* (2006.01)
(52) U.S. Cl. .............. 30/383; 173/162.2; 267/219
(58) Field of Classification Search ............ 30/381, 30/383; 267/137, 141, 153, 136, 140.11, 267/217, 219; 173/162.1, 162.2, 210, 211, 173/212
See application file for complete search history.

(56) References Cited

U.S. PATENT DOCUMENTS

| | | | | | |
|---|---|---|---|---|---|
| 3,652,074 | A | * | 3/1972 | Frederickson et al. ...... 267/137 |
| 3,728,793 | A | * | 4/1973 | Makinson et al. ............ 30/383 |
| 3,849,883 | A | * | 11/1974 | Kolorz ......................... 30/381 |
| 4,135,301 | A | * | 1/1979 | Hoeppner .................... 30/381 |
| 4,141,143 | A | | 2/1979 | Hirschkoff et al. |
| 4,202,096 | A | * | 5/1980 | Nagashima ................... 30/381 |
| 4,411,071 | A | * | 10/1983 | Takahashi et al. ............ 30/381 |
| 4,421,181 | A | * | 12/1983 | Andersson et al. ....... 173/162.2 |
| 4,424,960 | A | * | 1/1984 | Dan et al. .................... 267/219 |
| 4,535,976 | A | * | 8/1985 | Dan et al. .................... 267/219 |
| 5,038,480 | A | * | 8/1991 | Naslund ....................... 30/383 |
| 5,361,500 | A | | 11/1994 | Naslund et al. |
| 5,447,295 | A | * | 9/1995 | Taomo ........................ 267/153 |
| 5,699,865 | A | * | 12/1997 | Forderer et al. ......... 173/162.2 |
| 6,619,409 | B2 | * | 9/2003 | Iida ........................... 173/162.2 |
| 6,643,939 | B2 | * | 11/2003 | Tajima et al. ................. 30/381 |

FOREIGN PATENT DOCUMENTS

| | | | |
|---|---|---|---|
| DE | 1 043 708 A | | 3/1972 |
| DE | 29 11 498 A1 | | 10/1980 |
| DE | 39 31 221 A1 | | 4/1990 |
| DE | 43 34 924 A1 | | 4/1994 |
| JP | 8-128497 | * | 5/1996 |

* cited by examiner

*Primary Examiner*—Hwei-Siu C. Payer
(74) *Attorney, Agent, or Firm*—McCormick, Paulding & Huber LLP

(57) ABSTRACT

The invention pertains to a handheld implement, in particular a portable chainsaw (100), with a handle housing part (12) that contains at least one carrying handle (10), and with at least one motor housing part (16) that carries a drive unit (14) and is connected to the handle housing part (12) by means of an antivibration system that consists of at least one vibration-reducing element (18). The invention proposes an antivibration system of this type, in which the above-mentioned problems are solved due to the fact that an exchange of the vibration-reducing elements can be eliminated, wherein the antivibration system is still able to fulfill the individual requirements of the operator and the machine. This is achieved due to the fact that the at least one vibration-reducing element (18) is realized such that it can be adjusted with the aid of a tool or without requiring a tool.

1 Claim, 5 Drawing Sheets

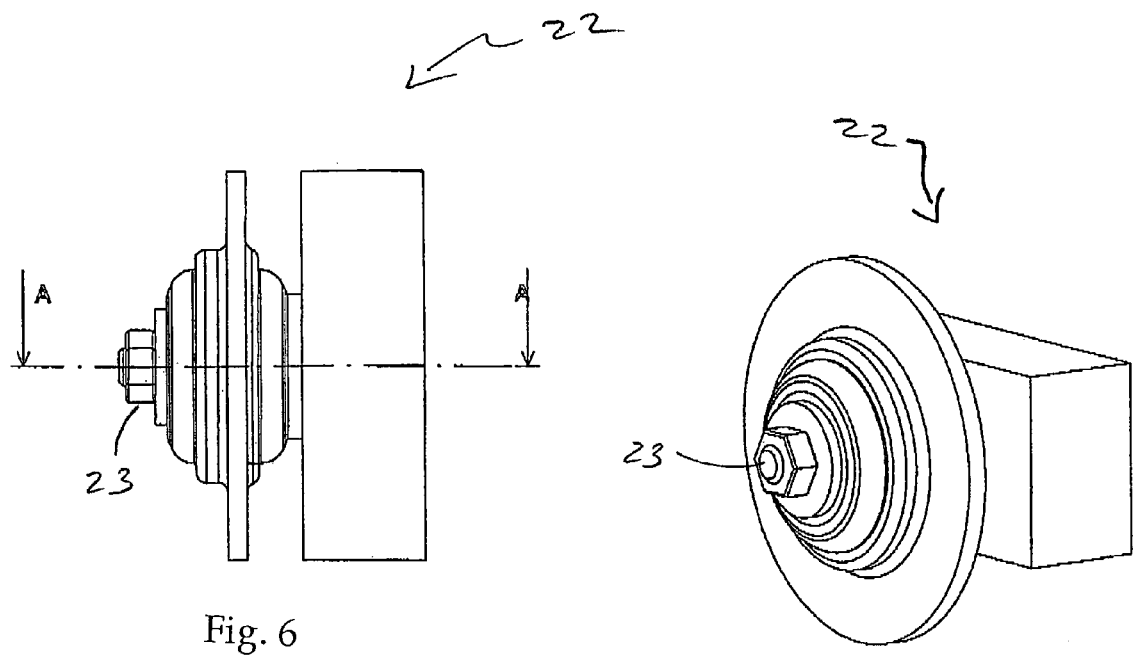
Fig. 5
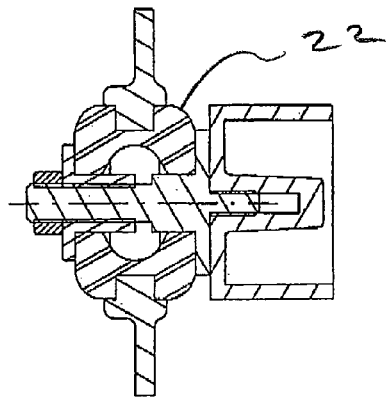
Fig. 6
Fig. 7

ADJUSTABLE ANTIVIBRATION SYSTEM, IN PARTICULAR FOR A HAND-HELD WORK MACHINE

CROSS-REFERENCE TO RELATED APPLICATIONS

This application is entitled to the benefit of and incorporates by reference in its entirety essential subject matter disclosed in German Patent Application No. 202 11 390.6 filed on Jul. 10. 2002.

FIELD OF THE INVENTION

This invention pertains generally to a damping system and, more specifically, to an antivibration system for use with hand held implements.

BACKGROUND OF THE INVENTION

It is common practice to arrange vibration-reducing elements on machine tools. Additional developments of known vibration-reducing elements are continuously introduced on the market in order to effectively dampen the vibrations, in particular, of chainsaws which are generated by the high-speed driving motors. The operating personnel are subjected to significant permanent stresses in the form of high-frequency vibrations that are primarily generated by the crank mechanism, as well as low-frequency vibrations generated by the implement (saw chain). This not only significantly impairs the work being performed with the chainsaws, but also results in frequent health problems when the operating personnel are subjected to such vibrations over extended periods of time.

In order to reduce the vibrations of chainsaws, the conventional handles intended for the left hand and the right hand of the operator are mounted on the front and the rear sections of the machine by means of so-called rubber-bonded-to-metal mountings or other vibration-reducing materials. In this known mounting of the handles, an effective reduction of the vibrations can be achieved if the elastic connection between the handle and the machine is sufficiently soft for achieving an adequate reduction of the vibrations generated by the motor within this connection such that they cannot be transmitted onto the handles.

A portable chainsaw is known from publication DE 1 271 370. This chain-saw is provided with two handles that are respectively mounted on the front and the rear sections of the machine by means of vibration-reducing elements. The handles are conventionally connected to one another in a rigid fashion, namely by means of a connection that forms a rigid frame together with the handles, and the vibration-reducing elements are arranged essentially perpendicular to the plane of the chain guide rail on at least three points of the motor unit.

It is also known that the vibration-reducing elements need to be occasionally exchanged. The vibration-reducing elements need to be exchanged for various reasons. For example, the relatively high permanent stresses, to which the vibration-reducing elements are subjected, cause wear such that the element needs to be exchanged in order to preserve the antivibration effect. In addition, the individual preferences of the different users, as well as different attachments with varying rail lengths or with different chain types, may make it necessary to exchange the vibration-reducing elements.

This exchange is very complicated and time-consuming and can frequently only be carried out in a workshop. If it becomes necessary to exchange the elements at the work site, for example, at a logging or construction site, the exchange can sometimes only be realized with special tools, wherein the chainsaw as a whole needs to be disassembled.

In order to ensure a simple exchange of the vibration-reducing elements, publication DE 89 13 638 U1 describes a chainsaw, in which a special moulded part can be separably fixed in a receptacle for the moulded part by means of a screw connection that is accessible from outside the housing.

SUMMARY OF THE INVENTION

Despite the achieved simplification in exchanging the vibration-reducing elements, it is still necessary to exchange the vibration-reducing elements either in a workshop or in the work site area.

Consequently, the invention is based on the objective of developing an antivibration system of the initially described type, in which the above-mentioned problems are solved due to the fact that an exchange of the vibration-reducing elements can be eliminated, wherein the antivibration system is still able to fulfill the individual requirements of the operator and the machine.

The invention proposes that a handheld implement contains a handle housing part with at least one carrying handle and at least one motor housing part that carries a drive unit and is connected to the handle housing part by means of an antivibration system consisting of at least one vibration-reducing element, and that at least one vibration-reducing element is adjustable.

According to one preferred embodiment of the invention, the at least one vibration-reducing element consists of a spring element and/or a damping element.

In another preferred embodiment of the invention, the handle housing part and the motor housing part with a rail connection are decoupled from one another by the at least one spring element and/or damping element.

In another preferred embodiment of the invention, the adjustment of the at least one vibration-reducing element is realized by defining a spring constant for the spring elements and/or a damping constant for the damping elements.

The spring constant of the at least one spring element depends on the thickness of the spring wire, the average winding diameter and the spring length. The spring constant can be varied in accordance with the requirements of a user by changing at least one of these parameters.

The invention also proposes that the spring constant of the spring element can be adjusted with at least one variable parameter. The adjustment essentially serves for adjusting a harder or a softer spring constant of the antivibration system. This primarily influences the handling characteristics of the handheld implement, as well as the force or cutting pressure that can be exerted before a so-called "hard contact " between the housing parts occurs. The vibrational characteristics can also be influenced. For example, resonance in the vibrations system [sic] can be prevented or shifted into non-critical speed ranges by adjusting at least one spring constant parameter of the spring element accordingly.

One particularly practical and easily variable parameter for adjusting the spring constant is the spring length. The spring length can be adjusted with different constructive solutions.

In one preferred embodiment of the invention, the spring element contains a rigid body in order to realize a static adjustment of the spring length by screwing the rigid body into or onto the spring element. This rigid body may, for example, consist of a screw that is screwed into or onto the spring element.

In another preferred embodiment of the invention, the spring element comprises a flexible body in order to realize a dynamic adjustment of the spring length by screwing the flexible body into or onto the spring element. The flexible body may consist of a spring element or a rubber part that needs to be screwed onto or into the spring element.

According to the invention, it is also possible to arrange an adjustable contact surface inside or outside the spring element in order to realize a progressive adjustment of the spring/damping characteristic.

According to the invention, it is also possible to adjust two opposing spring elements by varying the axial prestress and preserving the equilibrium of forces in order to influence the spring/damping characteristic.

The above-mentioned constructive solutions for realizing a certain spring length by means of static, dynamic and progressive adjustments, as well as a prestress adjustment, naturally may also be combined with one another.

In another preferred embodiment of the invention, the vibration-reducing damping elements for adjusting the damping constant are either realized in the form of solid dampers or hollow dampers. In order to achieve a certain damping constant, an axial prestress of the damping elements can be realized by designing the damping elements adjustably or installing the damping elements between the handle housing part and the motor housing part in the compressed state.

In a damping element that is realized in the form of a hollow damper, the damping constant can be adjusted with the aid of a rotatable eccentric ring arranged in the hollow damper. The invention also makes it possible to utilize hollow dampers that are either filled with compressed air or with a fluid. The hollow damper can be filled or ventilated by connecting an external pneumatic or hydraulic pressure generating unit such that the damping constant can be adjusted without having to remove the hollow damper.

It would also be conceivable to alter the damping characteristic by adjusting different frictional conditions on the damping elements.

BRIEF DESCRIPTION OF THE DRAWINGS

Other preferred embodiments of the invention are defined by the characteristics disclosed in the dependent claims.

One embodiment of the invention is described in greater detail below with reference to a chainsaw that is schematically illustrated in the figures. The figures show:

FIG. 5 illustrates an isometric view of a hollow damping element, according to one embodiment of the present invention.

FIG. 6 illustrates a side view of the hollow damping element shown in FIG. 5.

FIG. 7 is a cross-sectional view of the hollow damping element shown in FIG. 5.

DETAILED DESCRIPTION OF THE INVENTION

Figure 1:
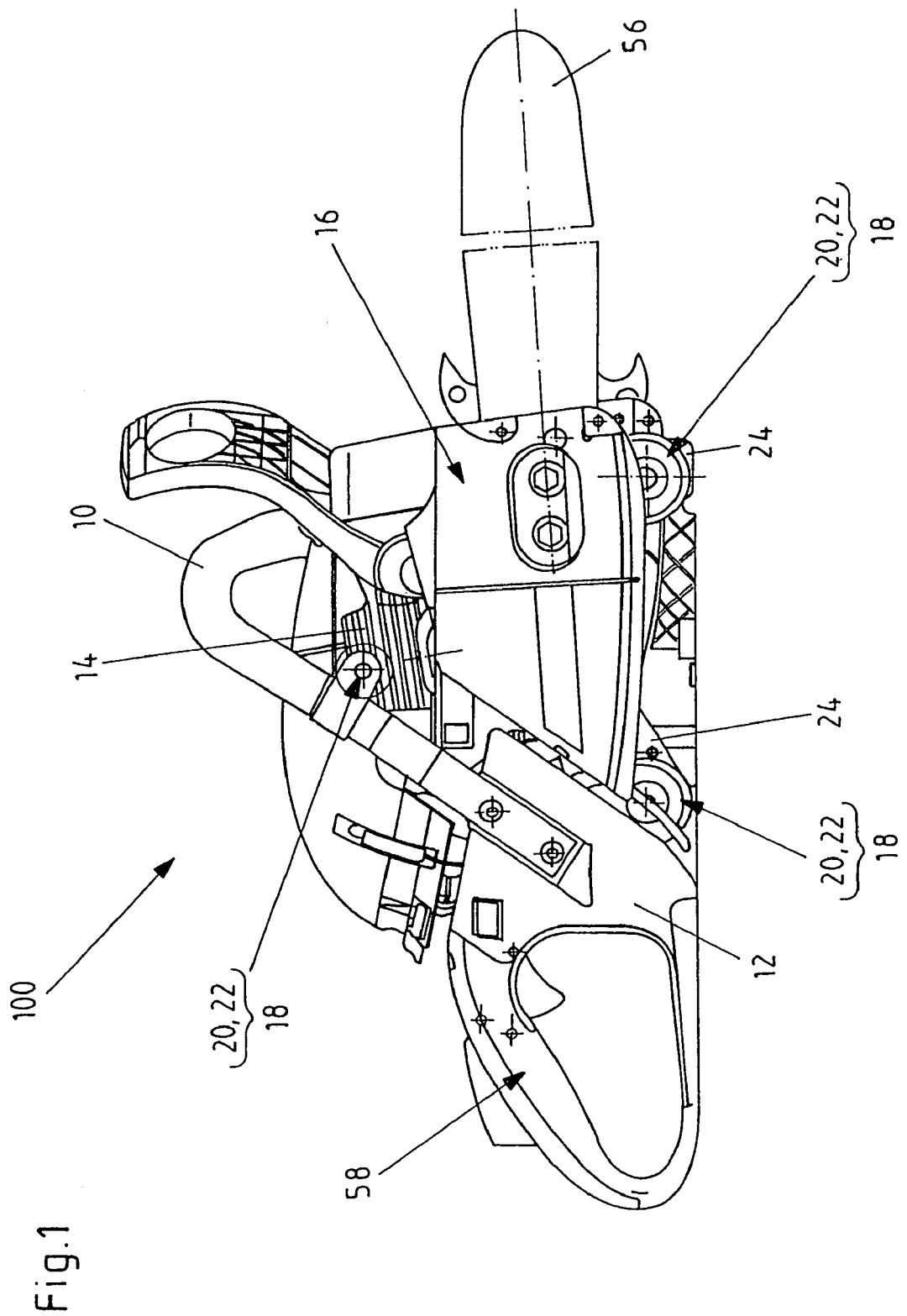
FIG. 1 a chainsaw with an antivibration system.

FIG. 1 shows a handheld implement in the form of a chainsaw 100. The chainsaw 100 essentially consists of a handle housing part 12 and a motor housing part 16. In this figure, the motor housing part 16 carries a drive unit in the form of a motor 14. Vibration-reducing elements 18 are used for realizing a vibrational decoupling between the handle housing part 12 and the motor housing part 16.

FIG. 1 also shows that the handle housing part 12 is realized similar to a pistol grip 58. The motor housing part 16 also comprises a cutting tool 56 that is arranged on the rail connection 24.

The vibration-reducing elements 18 are—according to FIG. 1—either realized in the form of a spring element 20 or a damping element 22. According to the invention, it is possible to use a combination of spring elements 20 and damping elements 22. Since the handle housing part 12 is decoupled from the motor housing part 16 by the vibration-reducing elements 18, it is possible to realize individual antivibration effects that differ with respect to the selection of the vibration-reducing elements 18.

Figure 2:
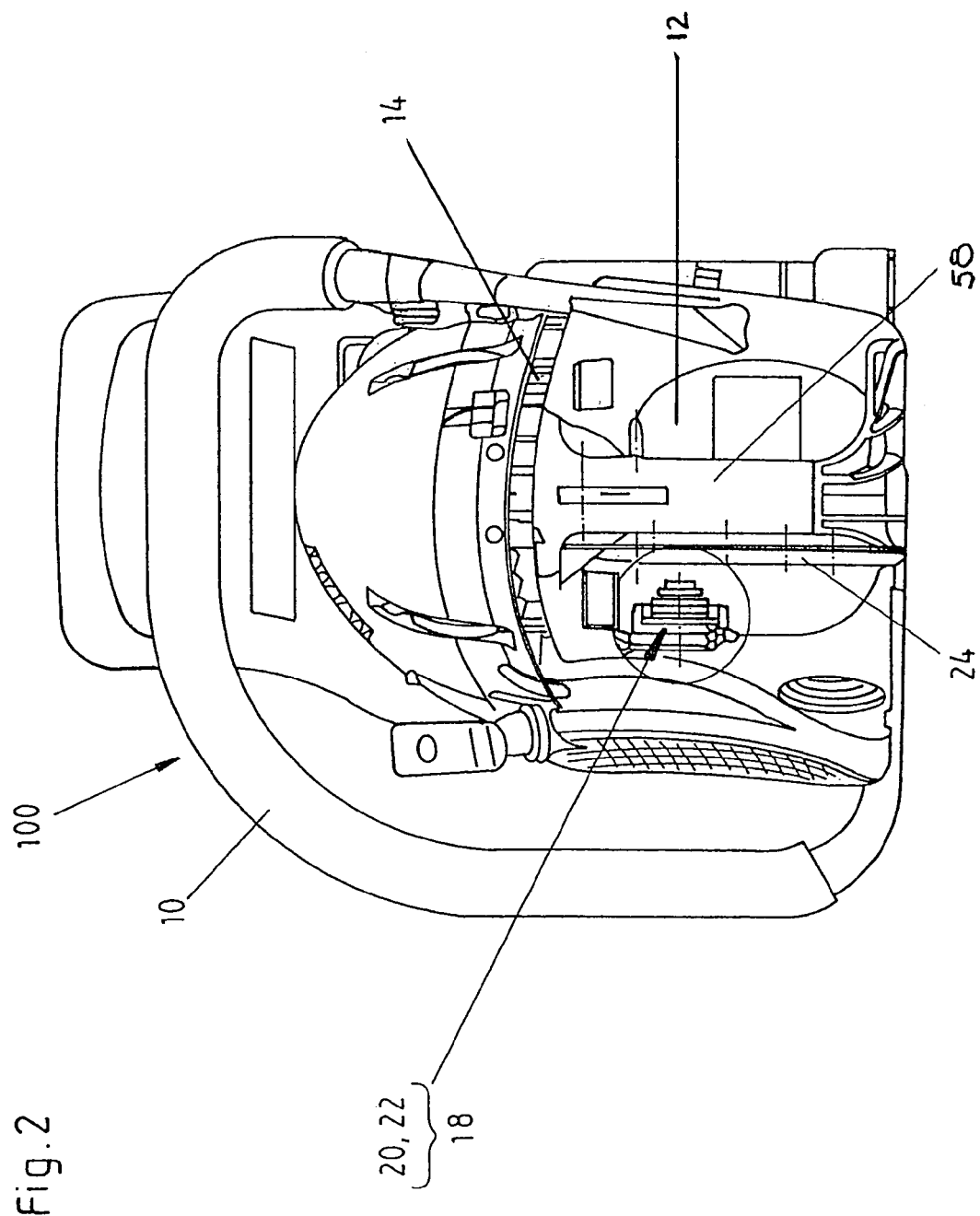
FIG. 2 the chainsaw from a viewing angle that is turned by 90°.

FIG. 2 shows the chainsaw 100 from a viewing angle that is turned by 90°, namely from the direction of the pistol grip 58. This figure shows the drive unit 14 that is situated underneath a cover, as well as the carrying handle 10 mounted on the handle housing part 12. This figure also shows another vibration-reducing element 18 that is not illustrated in FIG. 1. This vibration-reducing element 18 may also be realized in the form of a spring element 20 or a damping element 22.

FIG. 1 indicates that the vibration-reducing elements 18 shown are externally accessible.

Figure 3:
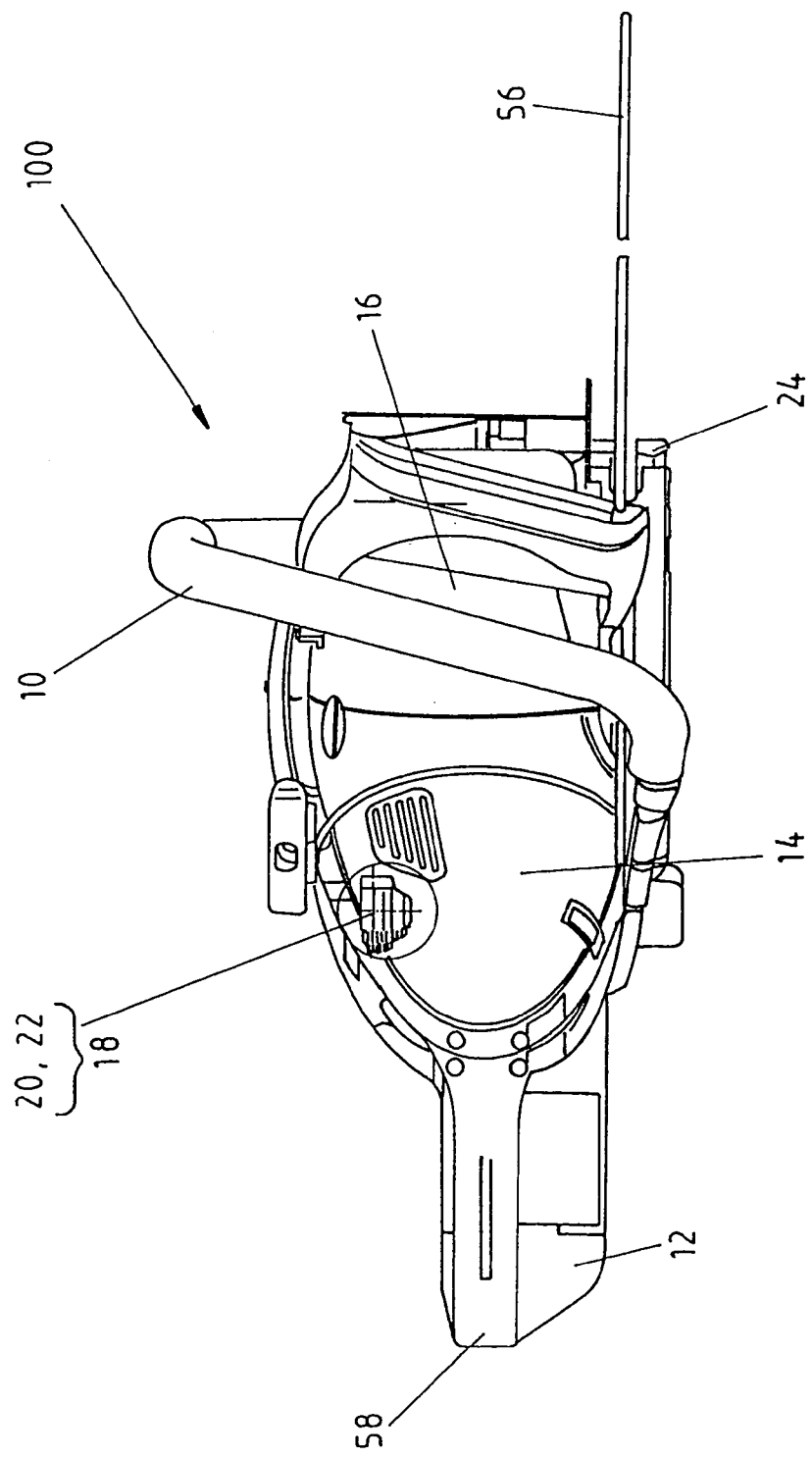
FIG. 3 a top view of the chainsaw.

The accessibility of the spring element 20 according to FIG. 2 is illustrated in FIG. 3 in the form of a top view of the chainsaw 100. FIG. 3 shows the chainsaw 100 with the carrying handle 10 and the pistol grip 58 arranged on the handle housing part 12, as well as the motor 14 that is situated underneath a cover. FIG. 3 also shows additional details of the rail connection 24 and the cutting tool 56. According to FIG. 3, the vibration-reducing element 18 is also externally accessible through a depression in the motor housing part 16.

The previous description makes it clear that the invention proposes an antivibration system, in which the vibration-reducing elements do not have to be exchanged in order to adjust individual properties of the antivibration system in accordance with the requirements of the user or the machine. This is achieved due to the fact that all vibration-reducing elements 18 are externally accessible and adjustable.

The adjustment of the vibration-reducing elements 18 can be realized with different constructive solutions. With respect to spring elements 20, an effective spring length can be adjusted in the form of statics, dynamic or progressive adjustments, as well as a prestress adjustment.

In the dynamic adjustment of spring elements 20, a flexible body is screwed into or onto the spring elements 20. This adjustment may, for example, be realized with a not-shown spring element or a not-shown rubber part. An additional damping effect can be achieved if a rubber damping element 22 is utilized.

Figure 4:
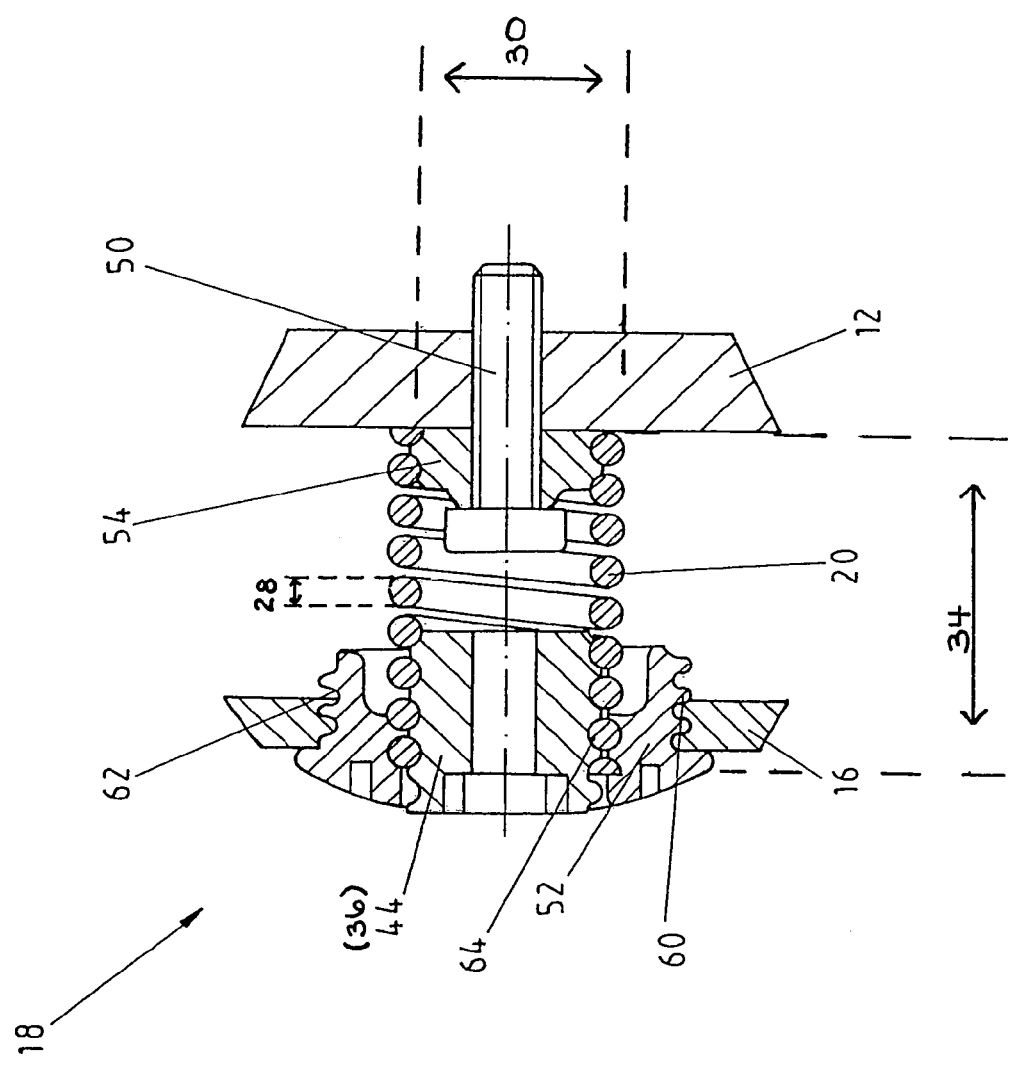
FIG. 4 an adjustable spring element.

In a progressive adjustment that is also not illustrated in the FIGS. 1 and 2, a contact surface such as 44/52, as shown in FIG. 4 is arranged inside or outside the spring element 20 and displaced, wherein the spring contacts this contact surface due to its vibrational movement and the spring length 34 is limited. The progressive adjustment makes it possible for the spring characteristic to remain un-changed in the idle mode, i.e., in the no-load mode, in the warm-up mode, etc.

The adjustment of a prestress can be realized similar to conventional wheel suspensions, namely by adjusting the effective spring length 34 (not illustrated in the figures) by varying the axial prestress of the spring elements 20 accordingly. In this case, it needs to be observed that two opposing spring elements 20 need to be interconnected such that an equilibrium of forces is achieved.

The damping elements may be realized in the form of solid dampers or hollow dampers 22, as shown in FIGS. 5–7. Adjustments of the damping constant can be carried out similar to those of the spring elements 20, wherein the damping constant can be adjusted by means of an axial prestress via threaded adjusting element 23 in solid dampers and hollow dampers 22 or by means of rotatable eccentric rings arranged in hollow dampers. When utilizing vibration-reducing elements 18 in the form of hollow dampers 22, it is, according to the invention, also possible to fill the hollow damper 22 with compressed air or fluid such that an adjustment of the damping element 22 can also be achieved in this fashion.

In friction dampers, the damping constant can be adjusted by varying the pressing force between the friction pairing.

FIG. 4 shows an exemplary spring elements 20 that makes it possible to carry out a static adjustment of the spring length 34. The thickness 28 of the spring wire and the average winding diameter 30 can be constructively defined, wherein the most practical option for adjusting a spring constant consists of varying the spring length 34. FIG. 4 schematically shows the handle housing part 12 and the motor housing part 16. The spring element 20 that serves as the vibration-reducing element 18 is situated between the handle housing part 12 and the motor housing part 16. In order to produce a connection between the spring element 20 and the handle housing part 12, a screw-type element 54 is fixed on the handle housing part 12, wherein the spring element 20 engages into said screw-type element on its outer circumference. The screw-type element 54 is fixed with the aid of a mounting screw 50. A spring cap 52 is arranged in the region of the motor housing part 16, wherein a thread 60 is arranged on the outer circumference of the spring cap which can be screwed into at least one thread 62 of the motor housing part 16. The inner circumference of the spring cap 52 contains at least one recess 64 that is realized with the corresponding spring wire thickness 28 such that the spring element 20 engages into the at least one recess 64 with its spring wire.

FIG. 4 elucidates how the spring length 34 is directly influenced in the form of a static adjustment of the spring element 20 by screwing a rigid body 36, in this case, a specially designed adjusting screw 44, into the spring element 20 that is connected to the motor housing part 16 by means of the spring cap 52. The adjusting screw 44 can be screwed into and unscrewed from the spring element 20 with a hexagonal wrench. A harder spring characteristic is adjusted when screwing the adjusting screw 44 into the spring element 20. Accordingly, a comparatively softer spring characteristic of the vibration-reducing element 18 is achieved when the adjusting screw 44 is unscrewed from the spring element 20.

If the construction/design is chosen accordingly, it would also be conceivable to realize an adjustment without requiring tools.

Since the antivibration system is realized such that the vibration-reducing elements 18 can be adjusted, it is advantageously possible to avoid adverse effect on the health of the operating personnel of handheld motor-operated implements, wherein the complicated and time-consuming disassembly and assembly which were required so far in order to exchange the vibration-reducing elements can simultaneously be reduced to a minimum.

| | |
|---|---|
| 100 | Chainsaw |
| 10 | Carrying handle |
| 12 | Handle housing part |
| 14 | Drive unit (motor) |
| 16 | Motor housing part |
| 18 | Vibration-reducing element |
| 20 | Spring element |
| 22 | Damping element |
| 24 | Rail connection |
| 28 | Thickness of spring wire |
| 30 | Average winding diameter |
| 34 | Spring length |
| 36 | Rigid body |
| 44 | Adjusting screw |
| 50 | Mounting screw |
| 52 | Spring cap |
| 54 | Screw-type element |
| 56 | Cutting tool |
| 58 | Pistol grip |
| 60 | Teeth |
| 62 | Groove |
| 64 | Recess |

The invention claimed is:

1. A handheld implement, having a handle housing that contains a carrying handle, and with a motor housing that carries a drive unit and is connected to the handle housing by means of an antivibration system that comprises at least one vibration-reducing element and a threaded adjusting element in communication with said at least one vibration-reducing element, wherein the threaded adjusting element is selectively actuated to adjust the said one vibration-reducing element; and wherein said at least one vibration-reducing element further includes a hollow damping element that is filled with a fluid.

* * * * *